US008538352B2

(12) United States Patent  
Hirata

(10) Patent No.: US 8,538,352 B2  
(45) Date of Patent: Sep. 17, 2013

(54) RADIO BASE TRANSCEIVER STATION AND POWER SUPPLYING METHOD

(75) Inventor: Shuya Hirata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/882,359

(22) Filed: Sep. 15, 2010

(65) Prior Publication Data

US 2011/0065396 A1 Mar. 17, 2011

(30) Foreign Application Priority Data

Sep. 16, 2009 (JP) ................................. 2009-214201

(51) Int. Cl.  
*H04B 1/04* (2006.01)

(52) U.S. Cl.  
USPC ............... 455/127.1; 455/574; 455/127.4; 455/343.1; 320/162

(58) Field of Classification Search  
USPC ............ 455/127.1, 574, 127.4, 343.1, 343.5, 455/343.6, 13.4, 522; 320/162  
See application file for complete search history.

(56) References Cited

U.S. PATENT DOCUMENTS

| 6,801,146 | B2* | 10/2004 | Kernahan et al. | 341/122 |
| 6,841,983 | B2* | 1/2005 | Thomas | 323/322 |
| 7,523,329 | B2* | 4/2009 | Ezra et al. | 713/320 |
| 7,973,749 | B2* | 7/2011 | Uehara et al. | 345/87 |
| 8,112,114 | B2* | 2/2012 | Bubien, Jr. | 455/556.1 |
| 2006/0230304 | A1* | 10/2006 | Sanada | 713/600 |
| 2007/0176887 | A1* | 8/2007 | Uehara et al. | 345/102 |
| 2011/0254511 | A1* | 10/2011 | Tam | 320/162 |

FOREIGN PATENT DOCUMENTS

| JP | 60-204131 | 10/1985 |
| JP | 09-51304 A | 2/1997 |
| JP | 2002-330095 | 11/2002 |
| JP | 2006-304195 A | 11/2006 |

OTHER PUBLICATIONS

"Japanese Office Action" mailed by JPO and corresponding to Japanese application No. 2009-214201 on Apr. 16, 2013, with English translation.

* cited by examiner

*Primary Examiner* — Minh D Dao  
(74) *Attorney, Agent, or Firm* — Fujitsu Patent Center

(57) ABSTRACT

A radio base station includes a radio equipment to which a power is supplied from a power source which supplies the power from a battery and a power source unit, and a radio control device which controls the radio equipment, and wherein the radio base transceiver station performs control for changing an operating band of the radio equipment according to switching of a power supply source to and from the power source unit and the battery in the radio equipment.

13 Claims, 18 Drawing Sheets

FIG.5

| OPERATING BAND IN OPERATION PERFORMED BY REGULAR POWER SOURCE | 20MHz |
|---|---|
| OPERATING BAND IN OPERATION PERFORMED BY BATTERY | 5MHz |

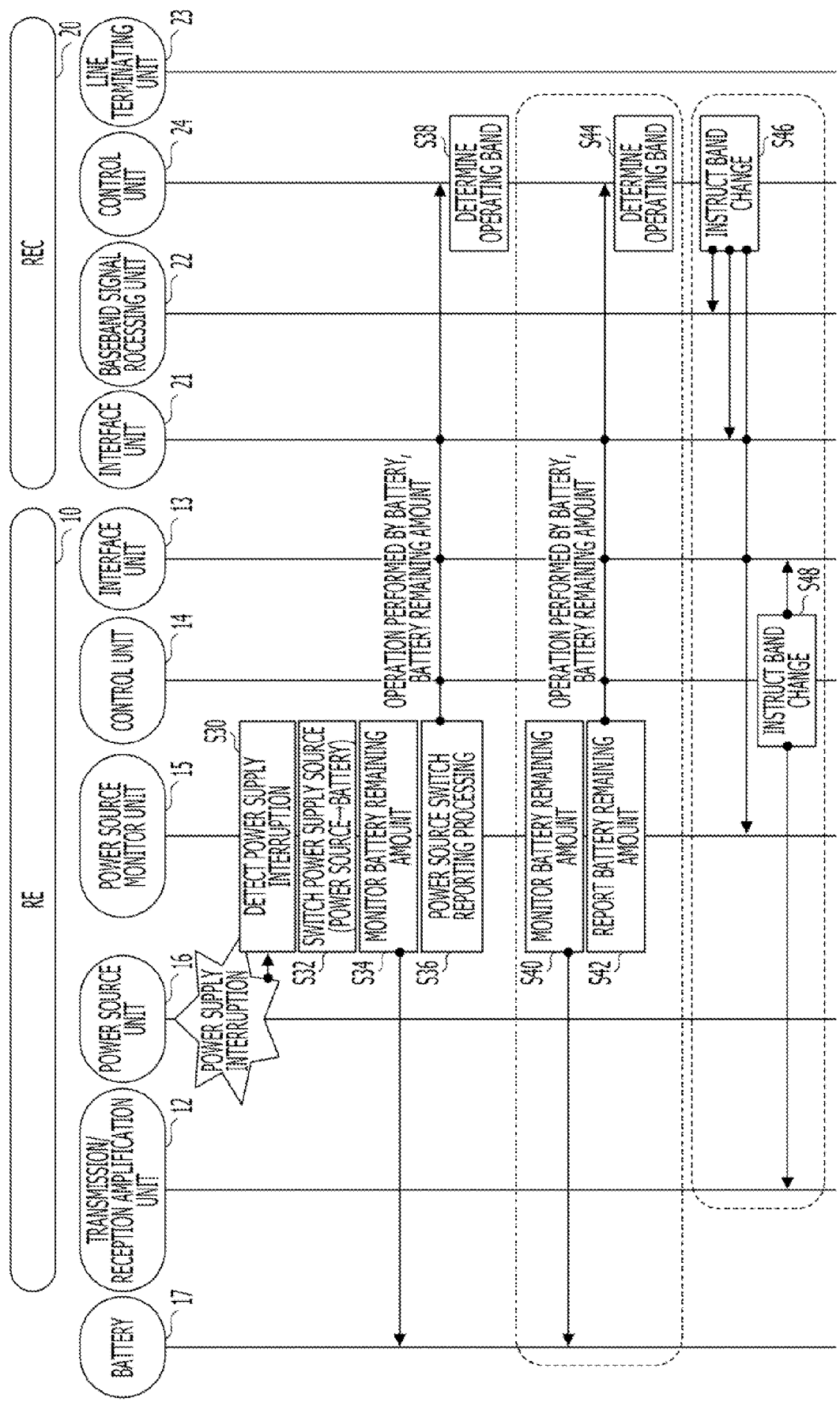

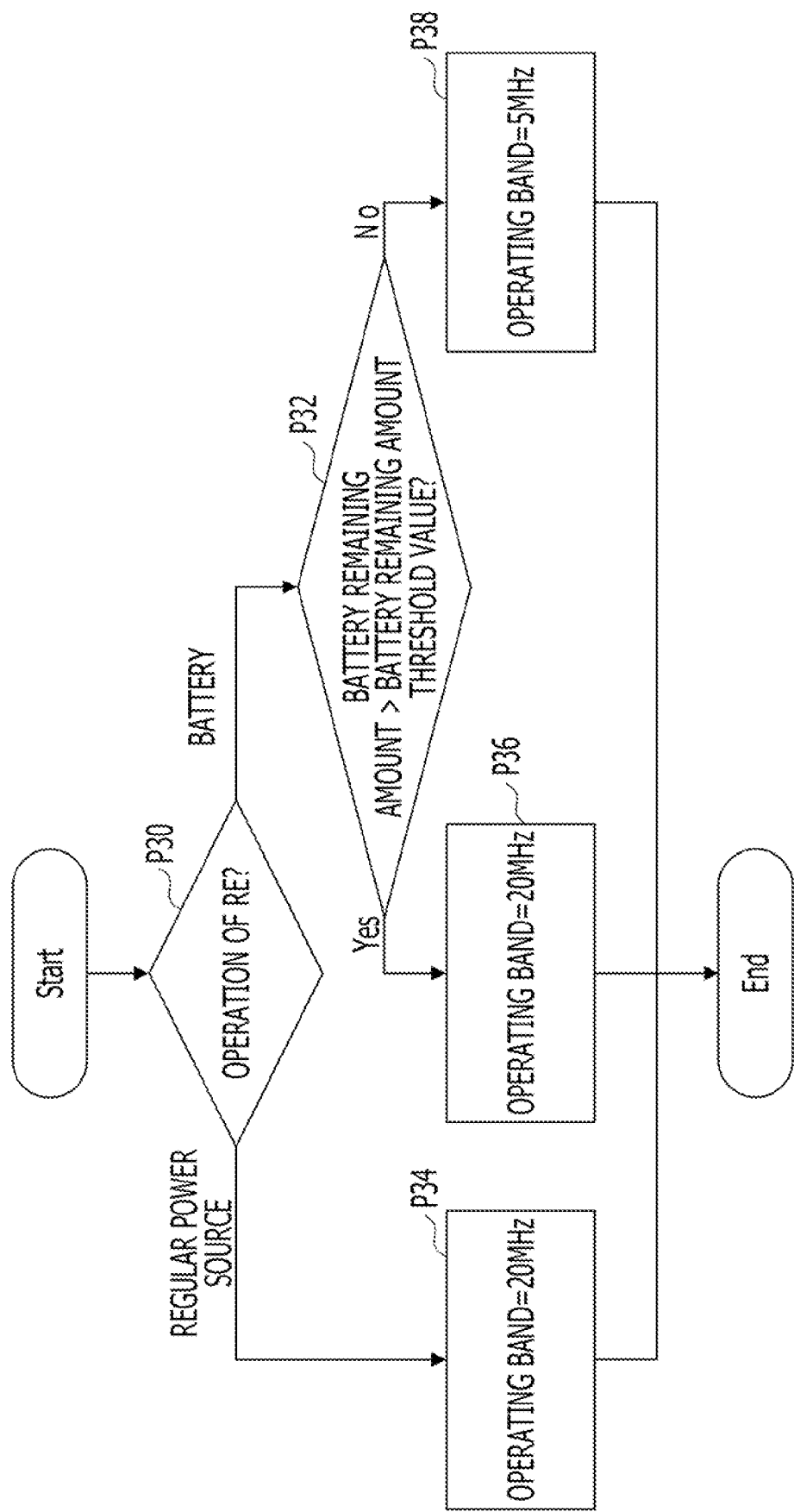

FIG.8

| | |
|---|---|
| OPERATING BAND IN OPERATION PERFORMED BY REGULAR POWER SOURCE | 20MHz |
| OPERATING BAND IN OPERATION PERFORMED BY BATTERY (IF BATTERY REMAINING AMOUNT IS OR LARGER THAN BATTERY REMAINING AMOUNT THRESHOLD VALUE) | 20MHz |
| OPERATING BAND IN OPERATION PERFORMED BY BATTERY (IF BATTERY REMAINING AMOUNT IS OR SMALLER THAN BATTERY REMAINING AMOUNT THRESHOLD VALUE) | 5MHz |
| BATTERY REMAINING AMOUNT THRESHOLD VALUE | 50% |

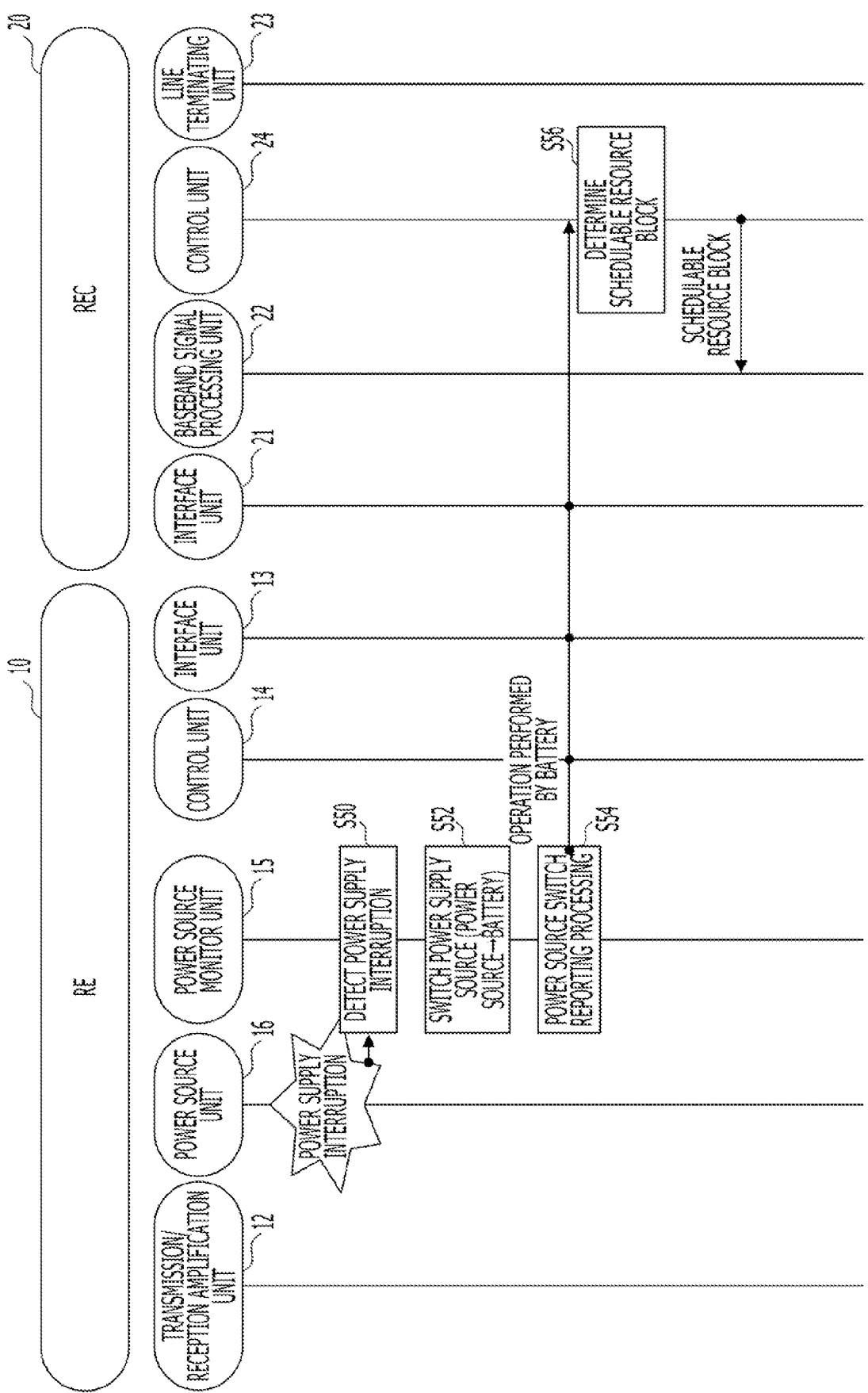

FIG.11

| RESOURCE BLOCK NUMBER | SCHEDULABLE OR NOT | |
|---|---|---|
| | OPERATION PERFORMED BY REGULAR POWER SOURCE | OPERATION PERFORMED BY BATTERY |
| 1 | SCHEDULABLE | UNSCHEDULABLE |
| 2 | SCHEDULABLE | UNSCHEDULABLE |
| ⋮ | ⋮ | ⋮ |
| 20 | SCHEDULABLE | SCHEDULABLE |
| 21 | SCHEDULABLE | SCHEDULABLE |
| ⋮ | ⋮ | ⋮ |
| 49 | SCHEDULABLE | UNSCHEDULABLE |
| 50 | SCHEDULABLE | UNSCHEDULABLE |

FIG.13

| MAXIMUM NUMBER OF SCHEDULABLE RESOURCE BLOCKS IN OPERATION PERFORMED BY REGULAR POWER SOURCE | 50 |
|---|---|
| MAXIMUM NUMBER OF SCHEDULABLE RESOURCE BLOCKS IN OPERATION PERFORMED BY BATTERY | 10 |

FIG.16

| RESOURCE BLOCK NUMBER | SCHEDULABLE OR NOT | | |
|---|---|---|---|
| | OPERATION PERFORMED BY REGULAR POWER SOURCE | OPERATION PERFORMED BY BATTERY (IF BATTERY REMAINING AMOUNT IS OR LARGER THAN BATTERY REMAINING AMOUNT THRESHOLD VALUE) | OPERATION BY BATTERY (IF BATTERY REMAINING AMOUNT IS OR SMALLER THAN BATTERY REMAINING AMOUNT THRESHOLD VALUE) |
| 1 | SCHEDULABLE | SCHEDULABLE | UNSCHEDULABLE |
| 2 | SCHEDULABLE | SCHEDULABLE | UNSCHEDULABLE |
| : | : | : | : |
| 20 | SCHEDULABLE | SCHEDULABLE | SCHEDULABLE |
| 21 | SCHEDULABLE | SCHEDULABLE | SCHEDULABLE |
| : | : | : | : |
| 49 | SCHEDULABLE | SCHEDULABLE | UNSCHEDULABLE |
| 50 | SCHEDULABLE | SCHEDULABLE | UNSCHEDULABLE |

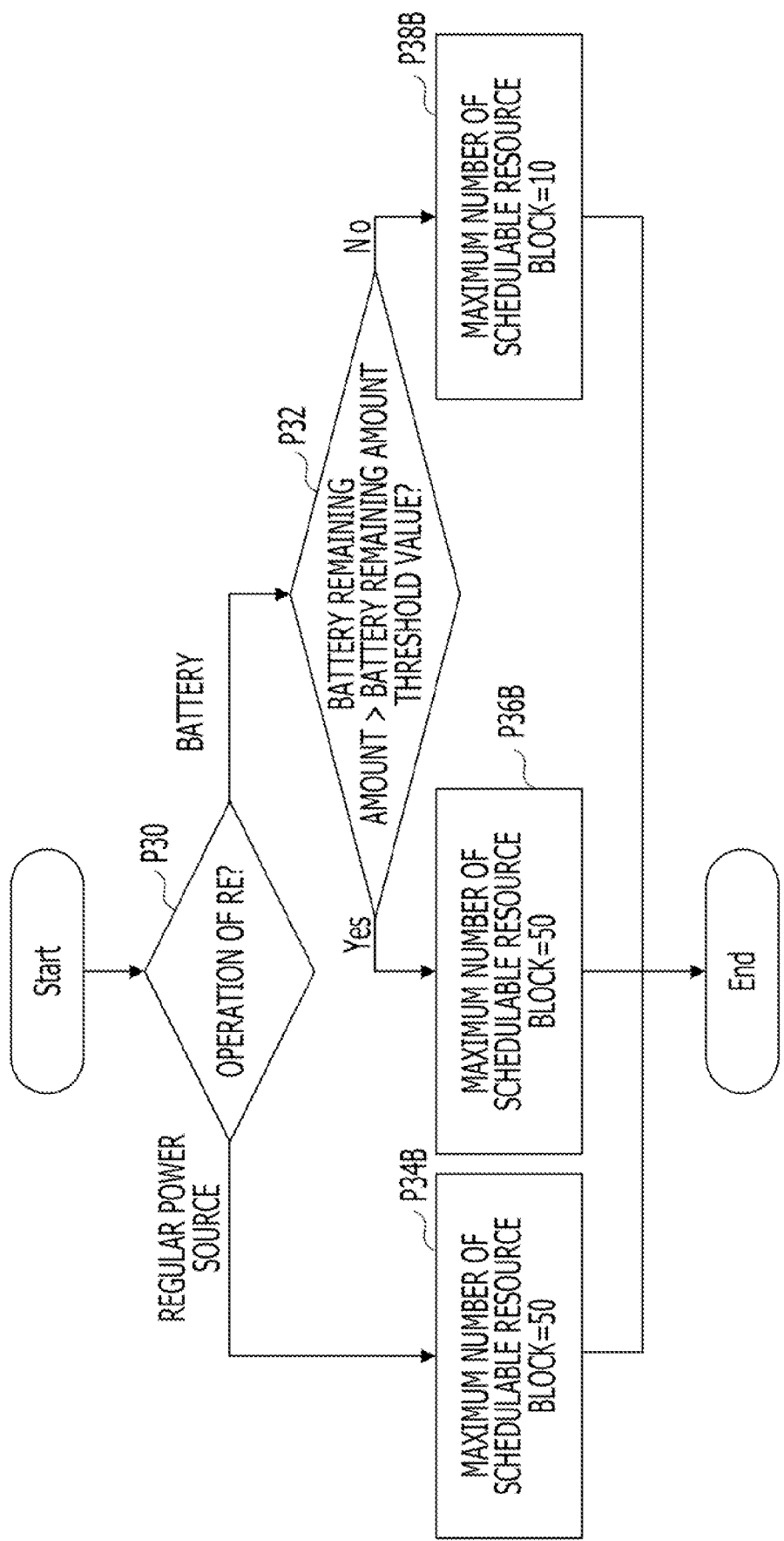

FIG.18

| | |
|---|---|
| MAXIMUM NUMBER OF SCHEDULABLE RESOURCE BLOCKS IN OPERATION PERFORMED BY REGULAR POWER SOURCE | 50 |
| MAXIMUM NUMBER OF SCHEDULABLE RESOURCE BLOCKS IN OPERATION PERFORMED BY BATTERY (IF BATTERY REMAINING AMOUNT IS OR LARGER THAN BATTERY REMAINING AMOUNT THRESHOLD VALUE) | 50 |
| MAXIMUM NUMBER OF SCHEDULABLE RESOURCE BLOCKS IN OPERATION PERFORMED BY BATTERY (IF BATTERY REMAINING AMOUNT IS OR SMALLER THAN BATTERY REMAINING AMOUNT THRESHOLD VALUE) | 10 |
| BATTERY REMAINING AMOUNT THRESHOLD VALUE | 50% |

RADIO BASE TRANSCEIVER STATION AND POWER SUPPLYING METHOD

CROSS-REFERENCE TO RELATED APPLICATIONS

This application is based upon and claims the benefit of priority from the prior Japanese Patent Application No. 2009-214201 filed on Sep. 16, 2009, the entire contents of which are incorporated herein by reference.

FIELD

The embodiments discussed herein relate to a radio base transceiver station. The embodiments may be applied to, for example, a radio base transceiver station using an Orthogonal Frequency Division Multiplexing (OFDM) method.

BACKGROUND

In a radio communication service, a radio facility includes a battery facility in most cases to continue an operation even in a case of a disaster or electric power outage.

The radio base transceiver station is configured to be separated into two parts: a Radio Equipment Controller (hereinafter referred to as "REC") using a Common Public Radio Interface (CPRI) as an interface unit inside the radio base transceiver station, and a Radio Equipment (hereinafter referred to as "RE").

The RE, which is provided in a space or on a pole on a rooftop in most cases, is required to be compact. The RE is often provided independently in a remote area away from a station. In this case, the battery facility is provided independently for the RE and is required to be compact.

Development of a 3.9 generation radio communication system has been made for a commercial service.

In the OFDM used in the 3.9 generation radio communication system, a plurality of sub carriers is bound as a single resource block. In the 3.9 generation radio communication system, the resource block is used to transmit a pilot signal and to transmit and receive user data as a common channel shared by a plurality of users.

FIG. 1 is a diagram illustrating a downlink of Long Term Evolution (LTE) as the 3.9 generation radio communication system using the OFDM and an example of a resource block in a case of 10 MHz bandwidth, and Normal Cyclic Prefix (CP).

In this example, there are fifty divided resource blocks, and the resource blocks are shared by a plurality of users. Allocation of the resource blocks is processed by a baseband signal processing unit. In a regular operation, scheduling is performed in such a way that use rate of a frequency band to be operated becomes the maximum (see, for example, Japanese Laid-Open Patent Publication No. 2006-304195, No. 09-51304).

Reducing power consumption of the RE is effective to make the battery compact. However, even when the RE is in a state in which the operation is performed by the battery, the REC does not change the operating band of the RE or the scheduling operation.

SUMMARY

According to an aspect of the invention, a radio base station includes a radio equipment to which a power is supplied from a power source which supplies the power from a battery and a power source unit, and a radio control device which controls the radio equipment, and wherein the radio base transceiver station performs control for changing an operating band of the radio equipment according to switching of a power supply source to and from the power source unit and the battery in the radio equipment.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is a diagram illustrating an example of processing for setting an operating band according to the first embodiment, FIG. 6 is a sequence diagram of processing for changing an operating band according to a second embodiment, FIG. 7 is a flowchart illustrating processing for determining an operating band according to the second embodiment, FIG. 8 is a diagram illustrating an example of setting of an operating band according to the second embodiment, FIG. 9 is a sequence diagram illustrating processing for determining a schedulable resource block according to a third embodiment, FIG. 11 is a diagram illustrating an example of setting a schedulable resource block according to the third embodiment, FIG. 13 is a diagram illustrating an example of setting a maximum number of schedulable resource blocks according to the fourth embodiment, FIG. 16 is a diagram illustrating an example of setting a schedulable resource block according to the fifth embodiment, FIG. 17 is a flowchart illustrating processing for determining a maximum number of schedulable resource blocks according to a sixth embodiment, and FIG. 18 is a diagram illustrating an example of setting the maximum number of schedulable resource blocks according to the sixth embodiment.

DESCRIPTION OF EMBODIMENTS

Figure 1:
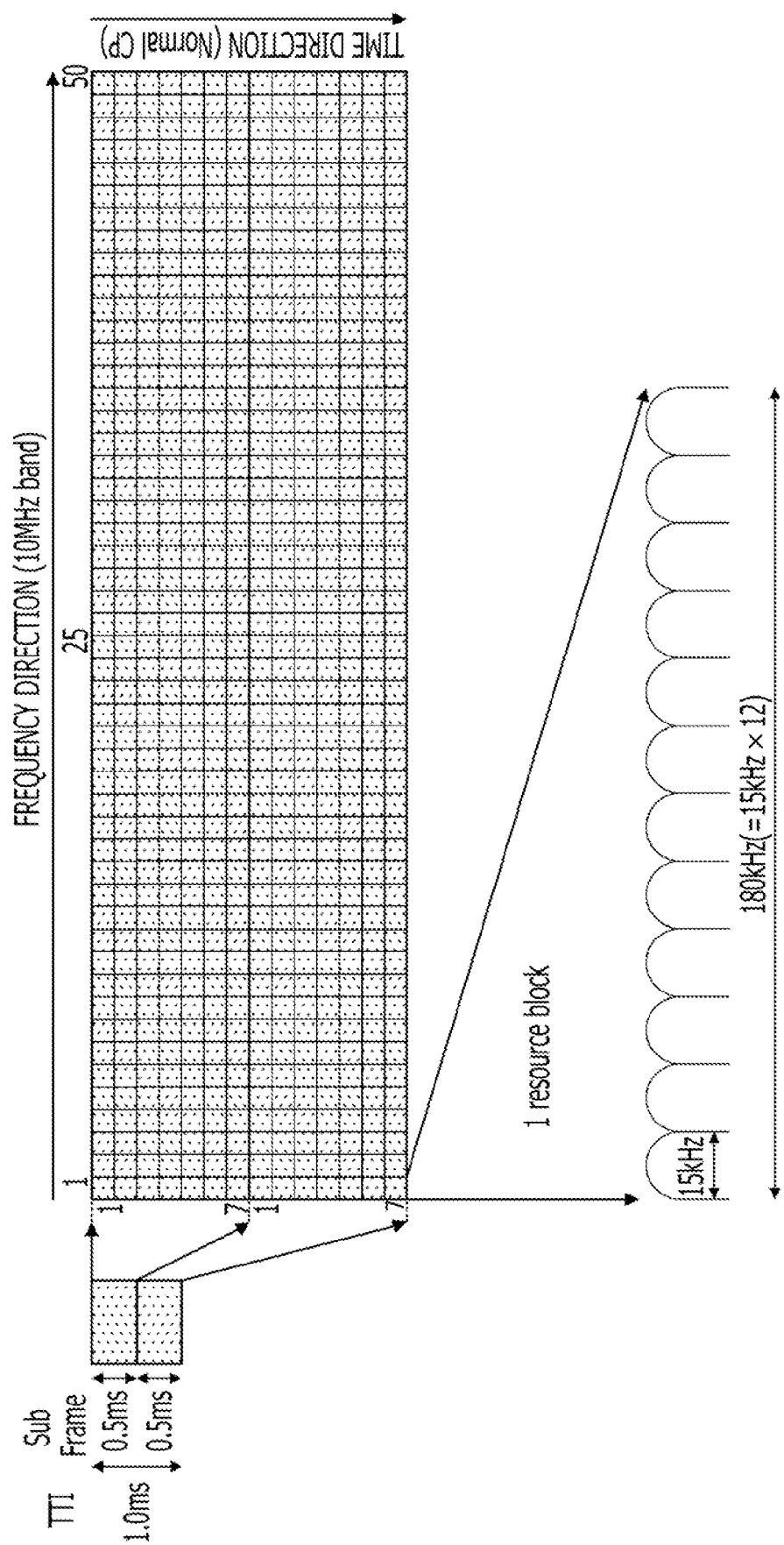
FIG. 1 is a diagram illustrating an example of a resource block of Long Term Evolution (LTE)

In the figures, dimensions and/or proportions may be exaggerated for clarity of illustration. It will also be understood that when an element is referred to as being "connected to" another element, it may be directly connected or indirectly connected, i.e., intervening elements may also be present. Like reference numerals refer to like elements throughout, and their repeated descriptions are omitted.

An aspect of an embodiment is to reduce the power consumption of the RE when the RE is in the state in which the operation is performed by the battery.

Figure 2:
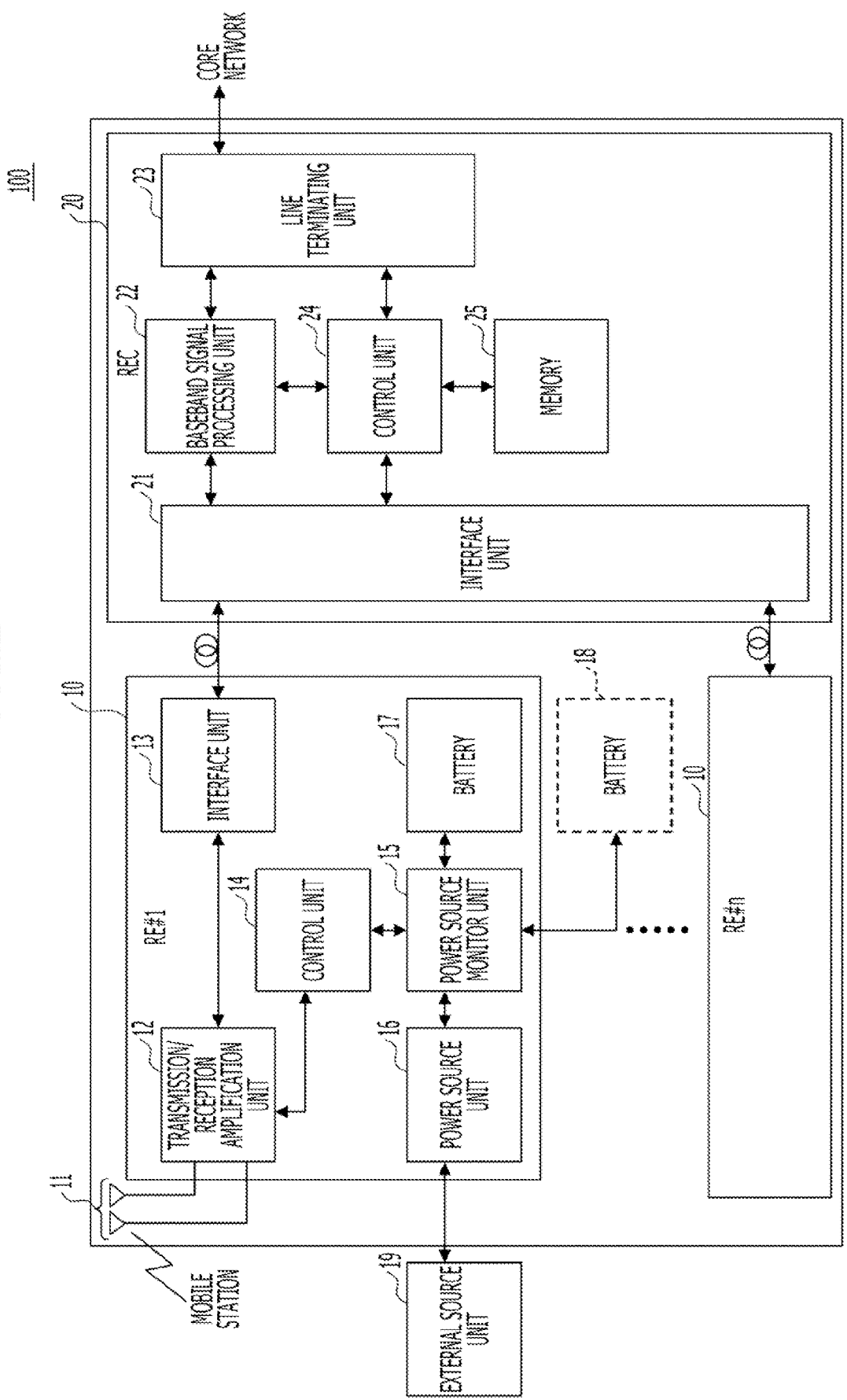
FIG. 2 is a block diagram illustrating a configuration of a radio base transceiver station in a configuration.

FIG. 2 is a block diagram illustrating a configuration of a radio base transceiver station 100 in a configuration. A radio base transceiver station 100 includes one or more REs (RE#1 to RE#n) 10 and a REC 20 that is connected to each RE 10. This connection is a fixed-line connection by an optical cable using, for example, a Common Public Radio Interface (CPRI). In another configuration, this connection may be a radio connection using an entrance radio.

The RE 10 includes, for example, an antenna 11, a transmission/reception amplification unit 12, an interface unit 13, a control unit 14, a power source monitor unit 15, a power source unit 16, and a battery 17. Instead of the battery 17 provided inside the RE 10, an external battery 18 may be connected to the RE 10. An external source unit 19 may supply power to the power source unit 16.

The antenna 11 transmits and receives a radio signal to and from a mobile station. A reception signal received by the antenna 11 is amplified by the transmission/reception amplification unit 12 and is then transmitted to the interface unit 13. The interface unit 13 converts the reception signal into a CPRI signal and transmits the CPRI signal to the REC 20.

The control unit 14 controls each of the units of the RE 10. The power source monitor unit 15 monitors the power source unit 16. If a power supply to the power source unit 16 from an external source unit 19 is interrupted, the power source monitor unit 15 switches a power supply source to the battery 17 or the external battery 18.

The REC 20 includes, for example, an interface unit 21, a baseband signal processing unit 22, a line terminating unit 23, a control unit 24, and a memory 25.

The interface unit 21 converts the CPRI signal received from the RE 10 into a baseband signal. The baseband signal converted by the interface unit 21 is processed by the baseband signal processing unit 22 and is then transmitted to the line terminating unit 23. The line terminating unit 23 performs line terminating processing and transmits user data to a core network as required.

The control unit 24 controls each of the units of the REC 20. The memory 25 stores data used by the control unit 24 to control the RE 10 and the REC 20.

With reference to the other diagrams, detailed description will be made below of operations of the radio base transceiver station 100.

Figure 3:
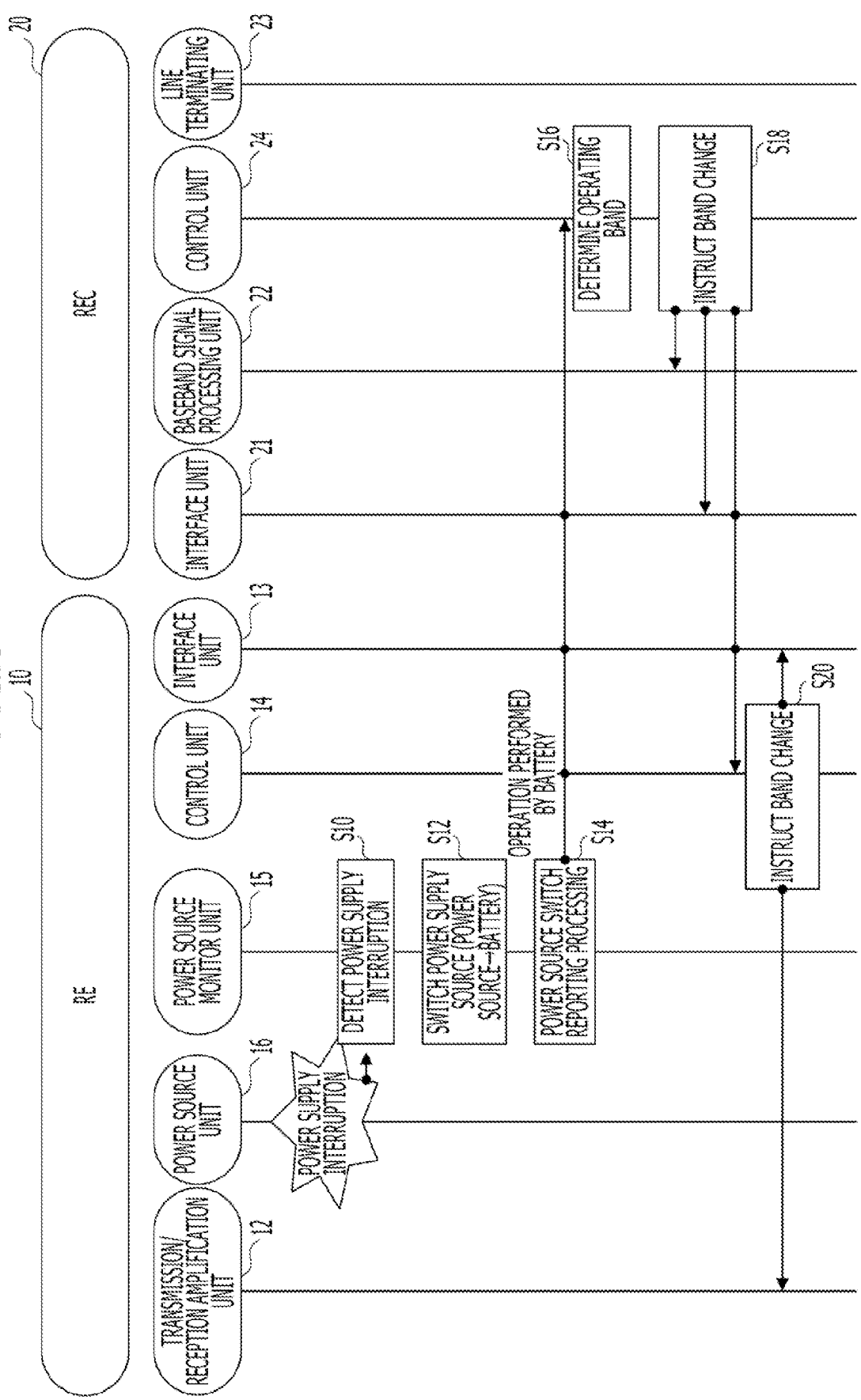
FIG. 3 is a sequence diagram illustrating processing for changing an operating band according to a first embodiment.
Figure 4:
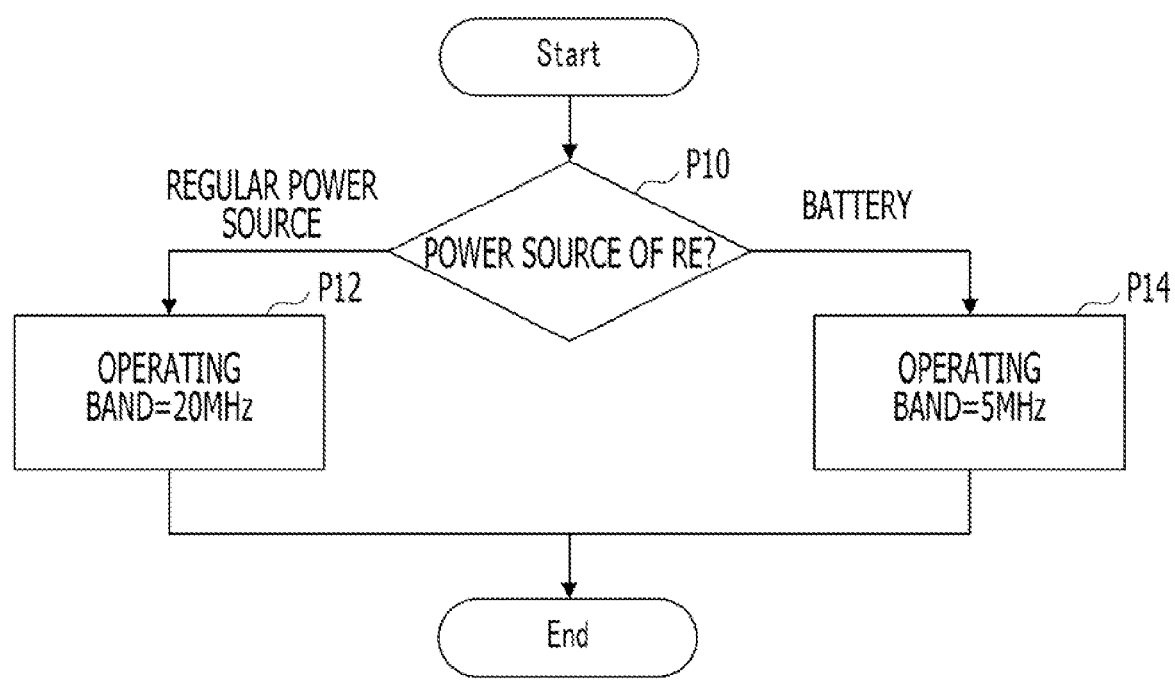
FIG. 4 is a flowchart illustrating processing for determining an operating band according to the first embodiment.

With reference to FIGS. 2 to 5, description will be made of a first embodiment. FIG. 3 is a sequence diagram illustrating processing for changing an operating band according to the first embodiment. FIG. 4 is a flowchart illustrating processing for determining an operating band according to the first embodiment. FIG. 5 is a diagram illustrating an example of setting an operating band according to the first embodiment.

The power source monitor unit 15 of the RE 10 monitors the power source unit 16. If the power supply is interrupted (Operation S10), the power source monitor unit 15 of the RE 10 switches the power supply source of the operation to the battery (Operation S12). The power source monitor unit 15 of the RE 10 transmits, to the control unit 14, a report of the switching to the operation performed by the battery and transmits the report of the switching to the control unit 24 of the REC 20 through the control unit 14 and the interface unit 13 of the RE 10, and the interface unit 21 of the REC 20 (Operation S14).

When receiving the report, the control unit 24 of the REC 20 follows the flowchart illustrated in FIG. 4 and determines the operating band depending on whether the operation is performed by the regular power source or the battery (Operation S16). The control unit 24 determines a state of the power source of the RE 10 (Operation S10). If the operation is performed by the regular power source, the control unit 24 specifies 20 MHz to the operating band (Operation P12). If the operation is performed by the battery, the control unit 24 specifies 5 MHz to the operating band (Operation P14).

The operating bands specified in this case are stored in the memory 25 of the REC 20 as illustrated in FIG. 5. The values of the operating band may be overwritten by an upper device.

After determining the operating band, the control unit 24 of the REC 20 transmits a band change instruction to the baseband signal processing unit 22, the interface unit 21, and the RE 10 (Operation S18). The band change instruction transmitted to the RE 10 is reported to the control unit 14 of the RE 10 through the interface unit 21 of the REC 20 and the interface unit 13 of the RE 10. The control unit 14 of the RE 10 transmits the band change instruction to the interface unit 13 of the RE 10 and the transmission/reception amplification unit 12 (Operation S20).

By performing the above-described processing, for example, the transmission power is reduced to approximately one quarter of the original power if the operating band of the operation by the regular power source is 20 MHz and if the operating band of the operation by the battery is 5 MHz. Accordingly, the power consumption is reduced. This may reduce the size of the battery 17 (or the battery 17 and the external battery 18). The battery has substantially the same size as the battery 17 may be used to perform the operation for a long period of time.

When the power supply is recovered, the power source monitor unit 15 of the RE 10 switches the power supply source from the battery 17 to the power source unit 16 and transmits, to the REC 20, a report indicating that the operation is performed by the regular power source. This makes it possible to recover the regular operation.

In the first embodiment, when the operation is performed by the battery, the RE 10 transmits, to the REC 20, the report indicating that the operation is performed by the battery. When receiving the report, the REC 20 changes the operating band. Consequently, the consumption power is reduced as the transmission power is reduced. This makes it possible to make the battery compact or to perform the operation by the battery for a long period of time.

With reference to FIG. 2 and FIGS. 6 to 8, description will be made of a second embodiment. The second embodiment differs from the first embodiment in the way that the RE 10 transmits a report indicating that the operation is switched to the operation performed by the battery and transmits the battery remaining amount to the REC 20. FIG. 6 is a sequence diagram illustrating changing an operating band when the operation is performed by the battery according to the second embodiment. FIG. 7 is a flowchart illustrating determining an operating band according to the second embodiment. FIG. 8 is a diagram illustrating an example of setting an operating band according to the second embodiment.

The power source monitor unit 15 of the RE 10 monitors the power source unit 16. If the power supply is interrupted (Operation S30), the power source monitor unit 15 of the RE 10 switches the operation to the operation performed by the battery (Operation S32). The power source monitor unit 15 of the RE 10 checks the battery remaining amount of the battery 17 (Operation S34). The RE 10 transmits the report of the switching to the operation performed by the battery and of the battery remaining amount to the control unit 24 through the interface unit 21 of the REC 20 (Operation S36).

When receiving this report, the control unit 24 of the REC 20 follows the flowchart illustrated in FIG. 7 to determine whether the operation is performed by the regular power source or the battery. If the operation is performed by the battery, the control unit 24 performs determination of the operating band depending on whether the battery remaining amount is larger or smaller than a battery remaining amount threshold value that is set in advance (Operation S38). The control unit 24 checks the state of the power source of the RE 10 (Operation P30) and compares the battery remaining amount to the battery remaining amount threshold value in the state in which the operation is performed by the battery (Operation P32). The operating band is specified according to each case (Operation S34 to Operation S38). The operating band specified in this case is stored in the memory 25 of the REC 20 as illustrated in FIG. 8, for example. The values may be overwritten by the upper device. A slight band change may be made if a plurality of threshold values is provided.

Checking (Operation S40) and reporting (Operation S42) the battery remaining amount surrounded by a dotted line W1, and determining the operating band (Operation S44) are periodically performed. If the operating band is required to be changed, an operating band change instruction is transmitted.

After determining the operating band is performed, the control unit 24 of the REC 20 transmits the band change instruction to the baseband signal processing unit 22, the interface unit 21 of the REC 20, and the RE 10 (Operation S46). The band change instruction transmitted to the RE 10 is reported to the control unit 14 of the RE 10 through the interface unit 21 of the REC 20 and the interface unit 13 of the RE 10. The control unit 14 of the RE 10 transmits the band change instruction to the interface unit 13 of the RE 10 and the transmission/reception amplification unit 12 (Operation S48). The processing surrounded by a dotted line W2 is performed to change the operating band in the operating band determination.

Due to the above-described processing, the 20 MHz band, which is substantially the same as in the operation performed by the regular power source, is continuously used when the operation is performed by the battery because of an instantaneous power interruption, and the 5 MHz band is used when the power source supply is interrupted because of a fault or the like. By reducing the power consumption, the battery may be used for a long period of time.

When the power supply is recovered, the power source monitor unit 15 of the RE 10 switches the power supply source to the power source unit 16 from the battery 17 and transmits, to the REC 20, a power source switch report indicating that the operation is performed by the regular power source. This makes it possible to recover the regular operation.

As described above, in the second embodiment, the RE 10 transmits, to the REC 20, the report indicating that the operation is performed by the battery and transmits the battery remaining amount when the operation is performed by the battery. The REC 20 changes the operating band by comparing the battery remaining amount to the battery remaining amount threshold value that is set in advance. This makes it possible to perform a flexible operation by continuously using the 20 MHz band, which is the same as used in the regular operation, in the operation by the battery when the power supply is interrupted, and by using the 5 MHz band when the power supply source is interrupted because of a power source failure or the like.

[Third Embodiment]

Figure 10:
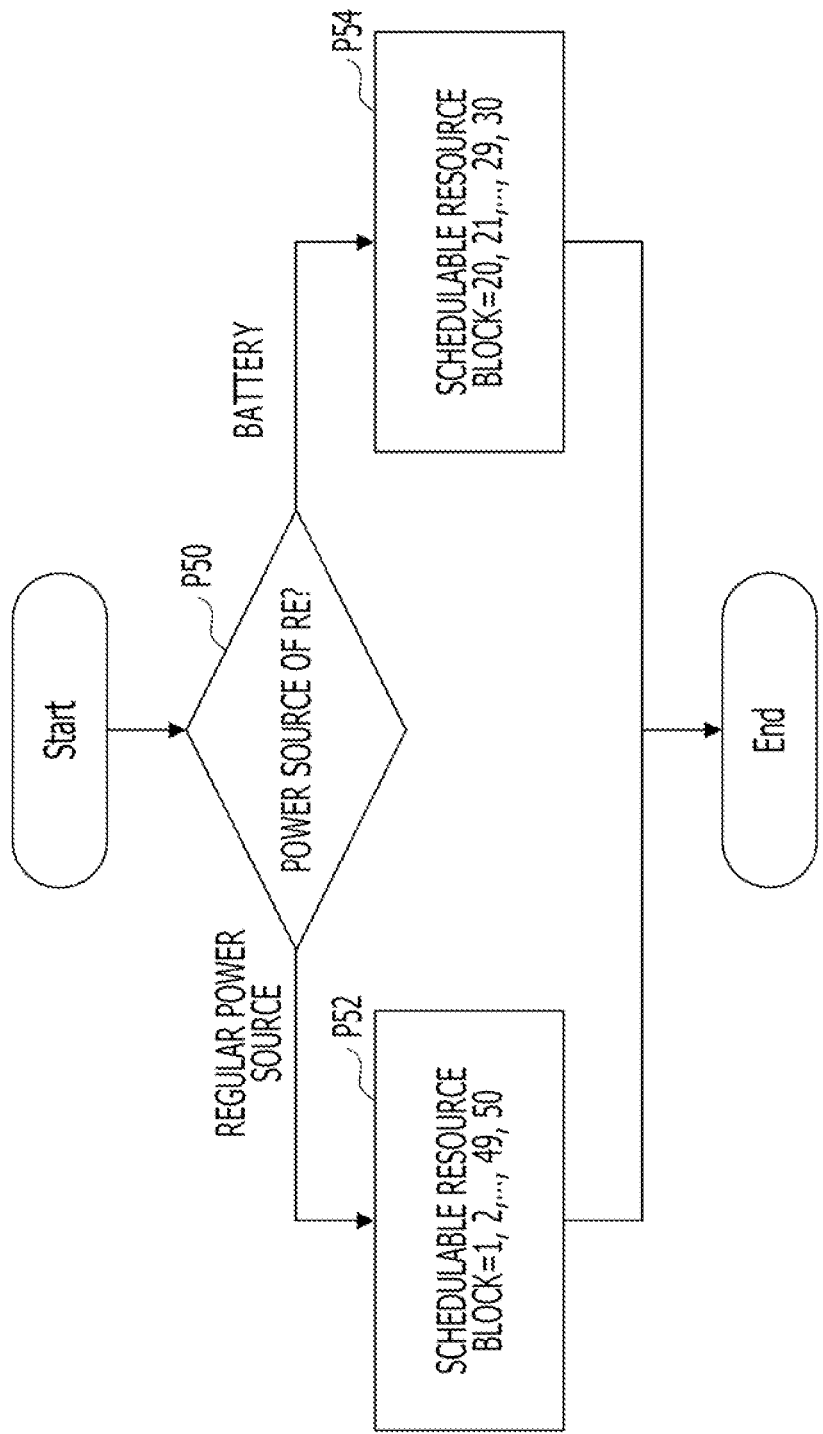
FIG. 10 is a flowchart illustrating the processing for determining a schedulable resource block according to the third embodiment.

With reference to FIG. 2, and FIGS. 9 to 11, description will be made of a third embodiment. The third embodiment differs from the first and second embodiments in the way that the schedulable resource block is changed when the operation is performed by the battery. FIG. 9 is a sequence diagram illustrating determining a schedulable resource block when the operation is performed by the battery according to the third embodiment. FIG. 10 is a flowchart illustrating determining a schedulable resource block according to the third embodiment. FIG. 11 is a diagram illustrating an example of setting a schedulable resource block according to the third embodiment.

The power source unit 15 of the RE 10 monitors the power source unit 16. If the power supply is interrupted (Operation S50), e.g., the power supply from the external source unit 19 is interrupted, the power source unit 15 of the RE 10 performs the switching to the operation performed by the battery (Operation S52). The power source unit 15 of the RE 10 transmits, to the control unit 14, a report of the switching to the operation performed by the battery and transmits the report of the switching to the control unit 24 of the REC 20 through the interface unit 13 and the interface unit 21 of the REC 20 (Operation S54).

When receiving this report, the control unit 24 of the REC 20 follows the flowchart illustrated in FIG. 10 and determines the schedulable resource block depending on whether the operation is performed by the regular power source or the battery (Operation S56). The control unit 24 determines whether the power source of the RE 10 is the regular power source or the battery (Operation P50) and specifies a schedulable resource block according to the power source (Operation P52 and Operation P54). The schedulable resource block specified in this case is stored in the memory 25 of the REC 20 as illustrated in FIG. 11, for example. The values may be overwritten by the upper device.

After specifying the schedulable resource block, the control unit 24 of the REC 20 transmits the schedulable resource block to the baseband signal processing unit 22. The baseband signal processing unit 22 performs scheduling within a range of the specified schedulable resource blocks.

If the operating band is 10 MHz, the number of the resource blocks is 50 as described with reference to FIG. 1. For example, the scheduling is performed by using the resource blocks No. 1 to 50 when the operation is performed by the regular power source. The scheduling is performed by using the resource blocks No. 20 to No. 30 when the operation is performed by the battery. This may reduce the transmission power. In this case, since reconfiguration of the common channel or the like is not required, the transmission power may be reduced without stopping the system.

When the power supply is recovered, the power source monitor unit 15 of the RE 10 switches the power supply source from the battery to the power source and transmits a report as a power source switch report indicating that the operation is performed by the regular power source. This makes it possible to recover the regular operation.

[Fourth Embodiment]

Figure 12:
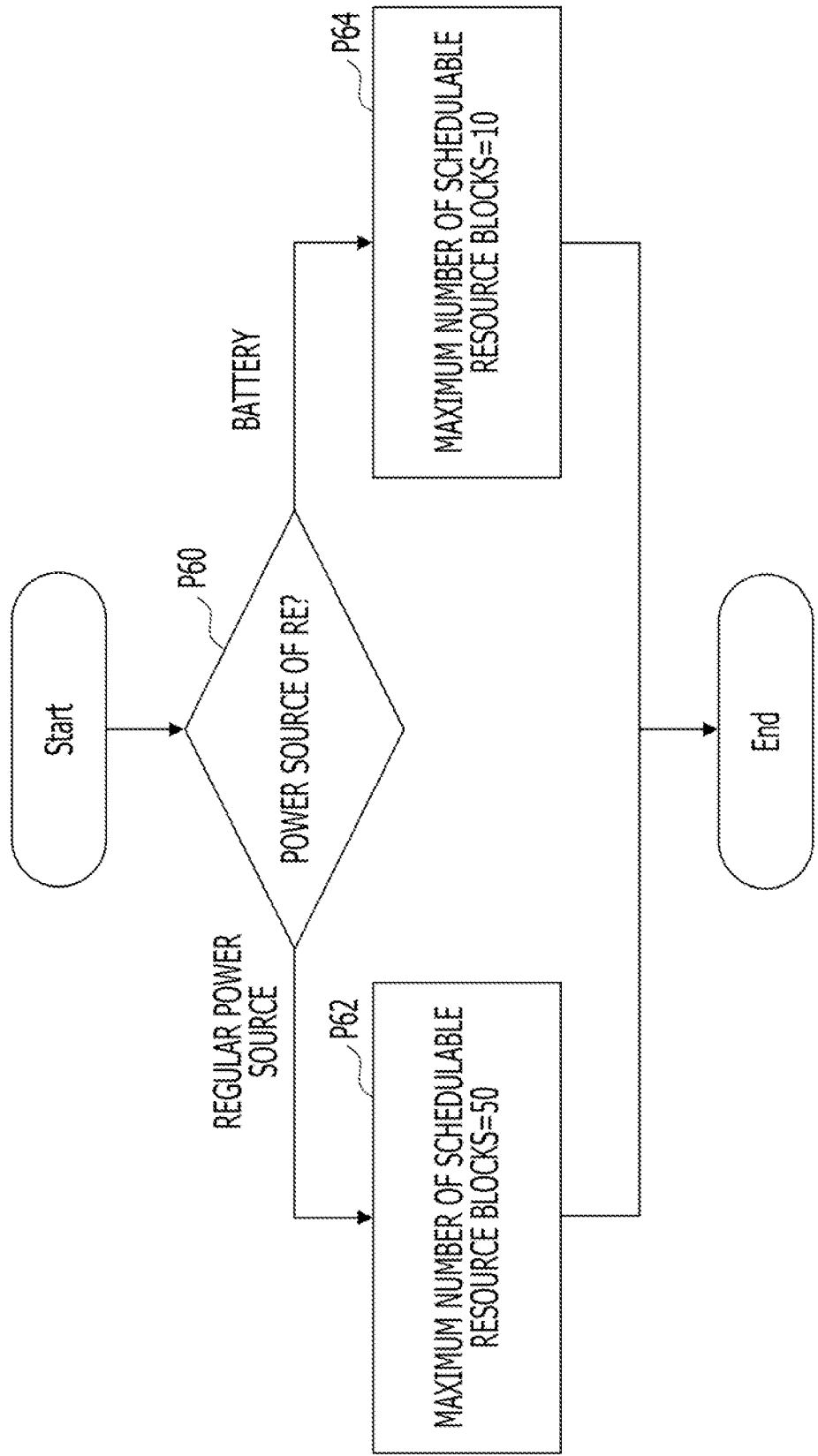
FIG. 12 is a flowchart illustrating processing for determining a maximum number of schedulable resource blocks according to a fourth embodiment.

With reference to FIG. 12 and FIG. 13, description will be made of a fourth embodiment. The fourth embodiment is a deformation example of the third embodiment. In the fourth embodiment, the schedulable resource block is not specified, and the maximum number of the schedulable resource blocks is specified.

By following the flowchart illustrated in FIG. 12, the maximum number of the schedulable resource blocks is calculated depending on whether the operation is performed by the regular power source or the battery. The control unit 24 determines whether the power source of the RE 10 is the regular power source or the battery (Operation P60), and specifies the maximum number of the schedulable resource blocks according to the power source (Operation P62 and Operation P64). The maximum number of the schedulable resource blocks specified in this case is stored in, for example, the memory 25 of the REC 20 as illustrated in FIG. 13. The values may be overwritten by the upper device.

After determining the maximum number of the schedulable resource blocks, the control unit 24 of the REC 20 transmits the maximum number of the schedulable resource blocks to the baseband signal processing unit 22. The baseband signal processing unit 22 performs the scheduling within the rage of the specified maximum number of the schedulable resource blocks.

If the operating band is 10 MHz, the number of the resource blocks is 50 as described with reference to FIG. 1. For example, fifty resource blocks are used to perform the scheduling in the operation performed by the regular power source, and up to 10 resource blocks are used to perform the scheduling in the operation performed by the battery, so that the transmission power may be reduced. In this case, since the reconfiguration of the common channel or the like is not required, the transmission power may be reduced without stopping the system. In the present embodiment, because the usable resource block number is not specified, throughput may be improved compared to the third embodiment in case of using a scheduler performing desirable allocation in consideration of fading.

When the power supply is recovered, the power source monitor unit 15 of the RE 10 switches the power supply source from the battery to the power source and transmits the power source switch report indicating that the operation is performed by the regular power source. This makes it possible to recover the regular operation.

In the third and fourth embodiments, when the operation is performed by the battery, the RE 10 transmits, to the REC 20, the report indicating that the operation is performed by the battery. When receiving the report of the switching to the operation performed by the battery, the REC 20 restricts a bandwidth for scheduling in the baseband signal processing unit 22 by limiting the schedulable resource block or the maximum number of the schedulable resource blocks. Consequently, the consumption power is reduced as the transmission power is reduced. This makes it possible to make the battery compact or to perform the operation by the battery for a long period of time. Since the scheduling is changed, the reconfiguration of the common channel or the like is not required. Therefore, the consumption power may be reduced without stopping the system. In a case of bandwidth restriction for scheduling by limiting the maximum number of the schedulable resource blocks, decrease of the throughput may be restricted to the minimum in a combination with a scheduler performing the desirable allocation in consideration of fading.

[Fifth Embodiment]

Figure 14:
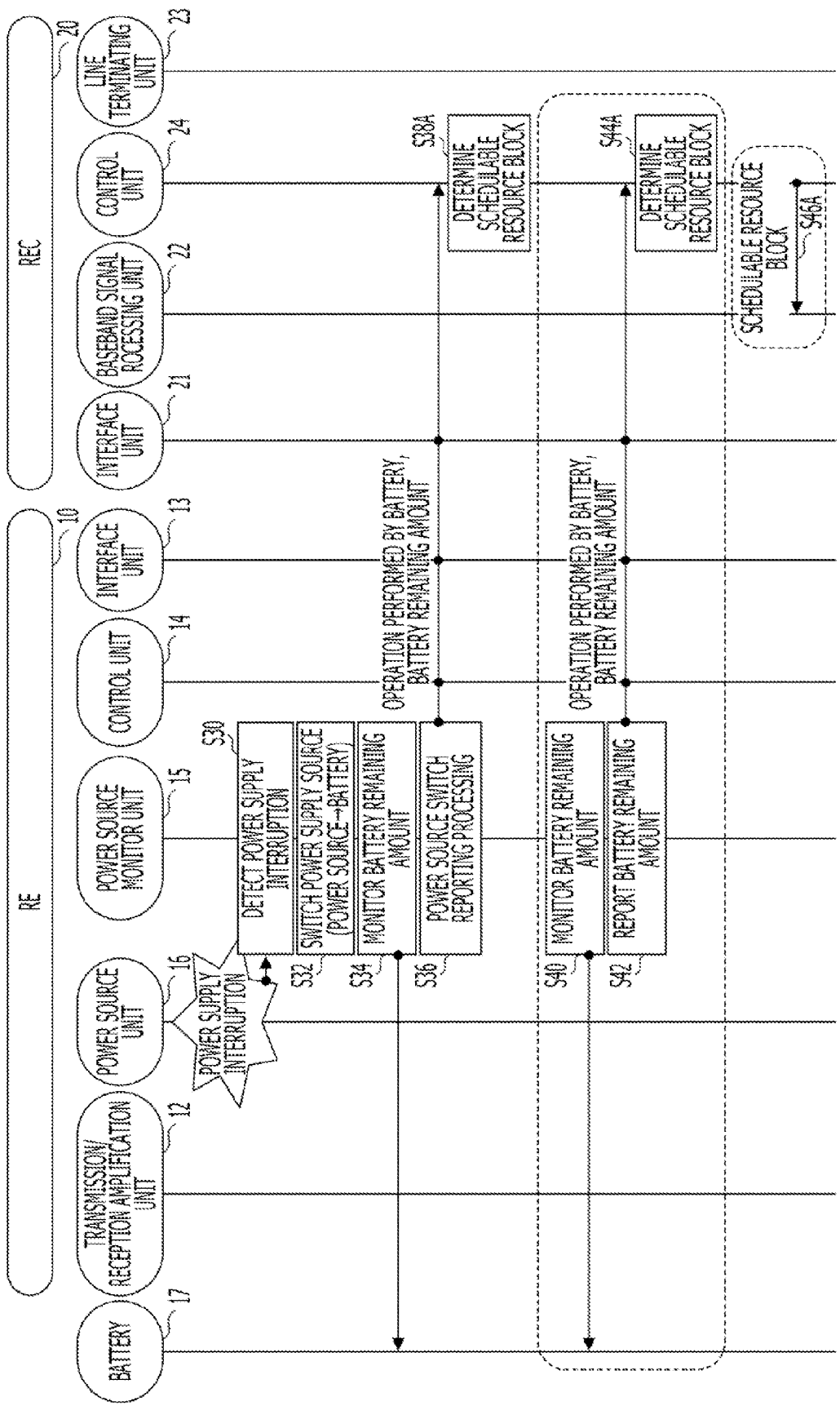
FIG. 14 is a sequence diagram illustrating processing for determining a schedulable resource block according to a fifth embodiment.
Figure 15:
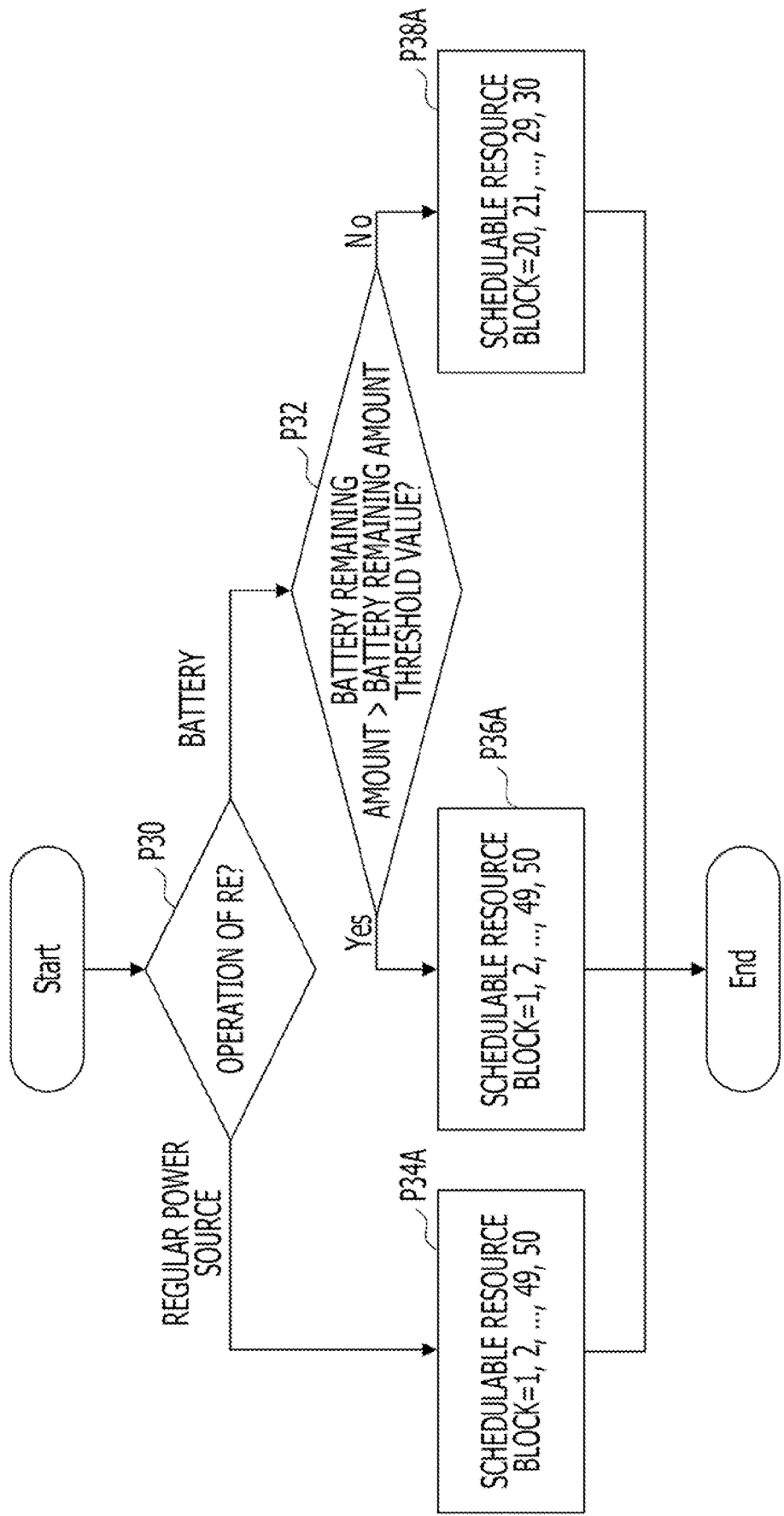
FIG. 15 is a flowchart illustrating the processing for determining a schedulable resource block according to the fifth embodiment.

With reference to FIG. 2 and FIGS. 14 to 16, description will be made of a fifth embodiment. The fifth embodiment is a combination of the second embodiment and the third embodiment. FIG. 14 is a sequence diagram illustrating determining a schedulable resource block when the operation is performed by the battery according to the fifth embodiment. FIG. 15 is a flowchart illustrating determining a schedulable resource block according to the fifth embodiment. FIG. 16 is a diagram illustrating an example of setting a schedulable resource block according to the fifth embodiment.

Monitoring the operation of the power source supply switching and the battery remaining amount on the RE 10 side, and transmitting the report of the operation by the battery from RE to REC and of the battery remaining amount (Operation S30 to Operation S36) are similar to the second embodiment. In the present embodiment, instead of the determination of the operating band, determination of the schedulable resource block is performed (Operation S38A).

When the schedulable resource block is calculated, the determination is performed by following the flowchart illustrated in FIG. 15 to determine whether the operation is performed by the regular power source or the battery. If the operation is performed by the battery, the determination of the schedulable resource block is performed depending on whether the battery remaining amount is larger or smaller than the battery remaining amount threshold value that is set in advance (Operation S44A). The control unit 24 checks the state of the power source of the RE 10 (Operation P30). If the power source is the battery, the control unit 24 compares the battery remaining amount to the battery remaining amount threshold value (Operation P32). The control unit 24 specifies the schedulable resource block according to each case (Operation S34A to Operation S38A). The schedulable resource block specified in this case is stored in, for example, the memory 25 of the REC 20 as illustrated in FIG. 16. The values may be overwritten by the upper device. A slight change of the schedulable resource block may be made if a plurality of threshold values is provided. Monitoring the battery remaining amount (Operation S40) surrounded by a dotted line W3, reporting the battery remaining amount (Operation S42), and determining the schedulable resource block (Operation S44A) may be periodically performed. The processing surrounded by a dotted line W4 is performed if the resource block is changed by the determination of the schedulable resource block, and the report is transmitted to the baseband processing unit.

By performing the above-described processing, a schedulable resource block may be flexibly set according to the battery remaining amount.

When the power supply is recovered, the power source monitor unit 15 of the REC 10 switches the power supply source from the battery to the power source and transmits, to the REC 20, a report as a power source switch report indicating that the operation is performed by the regular power source. This makes it possible to recover the regular operation.

[Sixth Embodiment]

With reference to FIG. 17 and FIG. 18, description will be made of a sixth embodiment. The sixth embodiment is a combination of the second embodiment and the fourth embodiment. The sixth embodiment is a deformation example of the fifth embodiment. In the sixth embodiment, the schedulable resource block is not specified, and the maximum number of the schedulable resource blocks is specified. FIG. 17 is a flowchart illustrating determining the maximum number of schedulable resource blocks according to the sixth embodiment. FIG. 18 is a diagram illustrating an example of setting the maximum number of the schedulable resource blocks according to the sixth embodiment.

When the maximum number of the schedulable resource blocks is calculated, the determination is performed by following the flowchart illustrated in FIG. 17 to determine whether the operation is performed by the regular power source or the battery (Operation P30). If the operation is performed by the battery, depending on whether the battery remaining amount is larger or smaller than the battery remaining amount threshold value (Operation P32), the maximum number of the schedulable resource blocks is determined (Operation P34B to Operation P38B). The maximum number of the schedulable resource blocks specified in this case is stored, for example, in the memory 25 of the REC 20 as illustrated in FIG. 18. The values may be overwritten by the upper device. A slight change of the schedulable resource block may be made if a plurality of threshold values is provided.

After determining the maximum number of the schedulable resource blocks, the control unit 24 of the REC 20 transmits the maximum number of the schedulable resource blocks to the baseband signal processing unit 22. The baseband signal processing unit 22 performs the scheduling within the range of the specified maximum number of the schedulable resource blocks.

By performing the above-described processing, the maximum number of the schedulable resource blocks may be flexibly set according to the battery remaining amount.

When the power supply is recovered, the power source monitor unit 15 of the RE 10 switches the power supply source from the battery to the power source and transmits, to the REC 20, a report as a power source switch report indicating that the operation is performed by the regular power source. This makes it possible to recover the regular operation.

In the fifth and the sixth embodiments, the RE 10 transmits, to the REC 20, the report indicating that the operation is performed by the battery and transmits, to the REC 20, the battery remaining amount when the operation is performed by the battery. The REC 20 limits the schedulable resource blocks or the maximum number of the schedulable resource blocks by comparing the battery remaining amount to the battery remaining amount threshold value that is set in advance. Due to this, the REC 20 restricts the bandwidth for scheduling in the baseband signal processing unit 22. This makes it possible to perform flexible operation limitation according to the battery remaining amount.

In the third, fourth, fifth, and sixth embodiments, the control unit 24 performs the determination of the schedulable resource block and the determination of the maximum number of the schedulable resource blocks. The baseband signal processing unit 22 may perform the determination when various parameters (a battery operation state, a battery remaining amount, and various setting tables) are reported to the baseband signal processing unit 22.

In the third, fourth, fifth and sixth embodiments, the schedulable resource blocks used for the scheduling and the maximum number of the schedulable resource blocks may be changed based on an instruction from the upper device, but not on control according to the operation state of the battery. In this case, for example, a low power consumption operation may be switched when a time or a region is used as a parameter.

In the above-described embodiments, the RE 10 is separated from the REC 20 in the configuration. The configuration may be applied to a radio base transceiver station in which the RE 10 is combined with the REC 20. All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has(have) been described in detail, it should be understood that the various changes, substitutions, and alterations could be made hereto without departing from the spirit and scope of the invention.

What is claimed is:

1. A radio base station comprising:
    a radio equipment which communicates with radio terminals using radio signals having a radio frequency bandwidth, and
    a radio control device which controls to change the radio frequency bandwidth of the radio equipment according to switching of a power source to the radio equipment between a power source unit and a battery.

2. The radio base station according to claim 1, further comprising:
    an external source unit that supplies power to the power source unit.

3. The radio base station according to claim 1, wherein:
    the radio equipment transmits a report of the switching of the power source in the radio equipment to the radio control device; and
    the radio control device performs the control for changing the operating band of the radio equipment according to the report.

4. The radio base station according to claim 1, wherein:
    the radio equipment reports a battery remaining amount when the power is supplied from the battery; and
    the radio control device performs the control for changing the radio frequency bandwidth of the radio equipment according to the battery remaining amount reported from the radio equipment.

5. The radio base station according to claim 1, wherein:
    the radio equipment transmits the report of the switching of the power source in the radio equipment to the radio control device; and
    the radio control device performs the control for changing the radio frequency bandwidth to be allocated to the radio equipment according to the report.

6. The radio base station according to claim 5, wherein the radio control device changes the radio frequency bandwidth allocated to the radio equipment by changing a resource block of frequencies.

7. The radio base station according to claim 5, wherein the radio control device changes the radio frequency bandwidth allocated to the radio equipment by changing a maximum number of resource blocks of frequencies.

8. The radio base station according to claim 7, wherein:
    the radio equipment reports the battery remaining amount when the power is supplied from the battery,
    and wherein the radio control device changes the radio frequency bandwidth allocated to the radio equipment according to the battery remaining amount reported from the radio equipment.

9. The radio base station according to claim 5, wherein:
    the radio equipment reports the battery remaining amount when the power is supplied from the battery; and
    the radio control device changes the radio frequency bandwidth allocated to the radio equipment according to the battery remaining amount reported from the radio equipment.

10. A radio equipment comprising:
    an amplification unit which transmits and receives a radio signal by using a plurality of radio frequency bands;
    a power source unit which serves as a power supply source to the radio equipment;
    a battery which also serves as the power supply source to the radio equipment;

a power source monitor unit which monitors the power source unit and switches the power supply source to the battery according to a state of a power supply from the power source unit, and a control unit which transmits, to a radio control unit, a report indicating that the power supply source is switched from the power source unit to the battery and which changes a radio frequency band of the amplification unit according to an instruction from the radio control device.

11. The radio equipment according to claim 10, wherein the state of the power supply from the power source unit includes a state of a power supplied from an external source unit that provides the power supply to the power source unit.

12. The radio equipment according to claim 10, wherein the power source monitor unit reports a remaining amount of the battery to the radio control device when the power is supplied from the battery.

13. A power supplying method of a radio equipment comprising:

transmitting and receiving a radio signal by using a plurality of radio frequency bands, supplying a power from a battery and an external source unit, switching a power supply source to the battery included in the radio equipment according to a state of a power supply from the external source unit, transmitting a report indicating that a power supply source is switched from the power source to the battery to a radio control device, and changing a radio frequency band of the amplification unit according to an instruction from the radio control device based on the report.

* * * * *